US005155357A

United States Patent [19]

Hemond

[11] Patent Number: 5,155,357

[45] Date of Patent: Oct. 13, 1992

[54] PORTABLE MASS SPECTROMETER

[75] Inventor: Harold F. Hemond, Lexington, Mass.

[73] Assignee: Massachusetts Institute of Technology, Cambridge, Mass.

[21] Appl. No.: 556,751

[22] Filed: Jul. 23, 1990

[51] Int. Cl.[5] ........................ B01D 59/44; H01J 49/00

[52] U.S. Cl. .................................... 250/291; 250/281

[58] Field of Search ............... 250/281, 290, 291, 296, 250/297

[56] References Cited

U.S. PATENT DOCUMENTS

| | | | |
|---|---|---|---|
| 2,221,467 | 11/1940 | Bleakney | 250/291 |
| 2,977,470 | 3/1961 | Robinson | 250/297 |
| 3,996,464 | 12/1976 | Sieradski et al. | 250/298 |
| 4,206,383 | 6/1980 | Anicich et al. | 250/427 |
| 4,459,844 | 7/1984 | Burkhart | 73/40.7 |
| 4,694,168 | 9/1987 | Le Beyec | 250/287 |
| 4,757,208 | 7/1988 | McKenna et al. | 250/398 |

FOREIGN PATENT DOCUMENTS 2026231A 1/1980 United Kingdom .

OTHER PUBLICATIONS

Viking Instruments Corporation, "SpectraTrak TM 600 Transportable GC/MS" Dec. 1990.

Daisey, "Realtime Portable Organic Vapor Sampling Systems: Status and Needs", Mar. 1987, p. 6.

Evans et al., "Monitoring Organic Vapors", *Environ. Sci. and Technol.*, 9(13):1134–1138 Dec. 1975.

Friesen et al., "A Portable, Remotely Operated, Computer Controlled, Quadrupole Mass" (1982).

Herzog et al., "A Portable MS Designed for Local Cerebral Blood Flow and Brain Tissue Metabolism Studies by Computer-Assisted Tomography, Using Inhaled Staple Xenon as Tracer", *29th Ann. Conf. on Mass Spectometry and Applied Topics*, Minneapolis (1981).

Newton, "A Portable Mass Spectrometer for Field and Laboratory Use", Jul. 7, 1975.

Nier, "High Performance-Double Focusing Mass Spectrometer", *Review of Scientific Instrumentation*, 56(2):214–219, Feb. 1985.

Pernicka, "Portable Mass Spectrometer/Computer for Air Pollution Analysis and Monitoring", Dec. 1990.

Roehrig, "Construction of a Bread Board Electronic System for a Light Weight Cold Cathode Cathode Quadrupole Mass Spectrometer", NASSA document, May 1969.

Rushneck, "Viking Gas Chromatograph-Mass Spectrometer", *Rev. Sci. Instrum.*, 49(6), Jun. 1978 p. 817.

Taya et al., "A Portable Double Focusing Mass Spectrometer", *Mass Spectrometry*, 25 (2) 141–152 Jun. 1977.

*Science*, vol. 249, p. 1598, 1990.

*Primary Examiner*—Bruce C. Anderson

*Attorney, Agent, or Firm*—Fish & Richardson

[57] ABSTRACT

A portable mass spectrometer system. The system includes a sample inlet for receiving a sample of analyte molecules and an ion source for producing sample ions by ionization of the sample molecules. A cycloid mass analyzer is provided and adapted to receive the sample ions. The mass analyzer has a means for inducing an electric field in an analysis region and a rear earth permanent magnet material for inducing a static magnetic field in the analysis region, oriented substantially normal to the electric field. A detector is provided for detection of said sample ions in the analysis region. A vacuum means maintains a low pressure in the analysis region. In various embodiments, the system is hand-portable and self-contained, including a 12V rechargeable battery power supply, and a magnet that includes a rare earth permanent magnetic material such as neodymium-iron and samarium-cobalt alloys.

39 Claims, 15 Drawing Sheets

PORTABLE MASS SPECTROMETER

The Government has rights in this invention pursuant to contract Number NA86AA-D-SG089 awarded by the Department of Commerce and contract Number DACA88-88-D-0002 awarded by the Department of the Army.

FIELD OF THE INVENTION

This invention relates to portable mass spectrometers.

BACKGROUND OF THE INVENTION

Mass spectral analysis of chemical samples is often carried out by obtaining a sample to be analyzed at a sampling site and transporting the sample to the location of the mass spectrometer, which is commonly a large instrument, made immobile by the need for heavy magnets, complex electronics and vacuum systems and a considerable and stable power supply. Furthermore, mass spectrometer performance, in general, benefits from a stable environment.

Typically, mass spectrometers are constructed using conventional magnetic and electric deflection mass analyzers and quadruple mass analyzers. These analyzer types require careful control of magnetic and electric fields. In the case of field deflection instruments, careful alignment and stability along the beam path is required. Minor deformations caused by physical and thermal stress have a deleterious effect on performance of the ion optics. Relatively high operating voltages e.g., in the range of over 1000 V are generally required for a field deflection scanning system of typical mass range. In the case of quadruples, precisely controlled RF power is required for stable operation.

Cycloid mass analyzers separate ions in a region having, at right angles, a magnetic field and an electric field. Typically, the magnetic field is supplied by a heavy permanent magnet. The electric field is induced in the magnet gap by a series of plates held at controlled potentials. Sample ions injected into the crossed-field region follow a spiral path, defined by their mass to charge ratio (m/e), toward the region where a detector is positioned. Variation of the electric field allows mass scanning.

Newton et al. in "A Portable Mass Spectrometer for Field and Laboratory Use" *Lawrence Livermore Laboratory Report*, Jul. 7, 1975 discloses a "portable" mass spectrometer system employing a cycloid mass analyzer constructed from a commercial instrument. The system requires electrical power from an external source. For experiments in remote areas, the system can be transported by air and installed in a trailer.

SUMMARY OF THE INVENTION

It is one object of the present invention to provide a low power consumption, light-weight, hand-carriable and self-contained battery powered mass spectrometer system having a cycloid mass analyzer for operation in remote areas. The invention is preferably for use with applications in which it is inconvenient or impractical to transport the sample to a central analysis facility. For example, environmental measurements of volatile pollutants and metabolic gases are preferably done in situ, i.e., at the site of, for example, a chemical spill. In situ measurement provides immediate information to the investigator while eliminating the need for sample collection and avoiding sample degradation that is a result of transport and storage. Operation in areas in which line power is not available and remote regions inaccessible by motor vehicle place an additional demand on the mass spectrometer system by requiring that it be hand-portable, i.e., it can be carried into the field by a single operator, and self-contained, i.e., the system carries its own power supply. Thus, the system bulk, weight and power consumption must be limited, without substantially sacrificing performance.

In one aspect, the invention features a portable mass spectrometer system. The system includes a sample inlet for receiving a sample of analyte molecules and an ion source for producing sample ions by ionization of the sample molecules. A cycloid mass analyzer is provided and adapted to receive the sample ions. The mass analyzer has a means for inducing an electric field in an analysis region and a rare earth permanent magnet material for inducing a static magnetic field in the analysis region oriented substantially normal to the electric field. A detector is provided for detection of the sample ions in the analysis region and a vacuum means is provided for maintaining a low pressure in the analysis region.

In various embodiments: the magnet material has an energy product of about $20\times10^6$ gauss-oersteds or more, more preferably an energy product in the range of about $30\times10^6$ gauss-oersteds or more. The magnet is selected from the group consisting of neodymium-iron and samarium-cobalt alloys. The magnet includes a magnet return assembly selected from the group consisting of mild steel and ironcobalt alloy such as vanadium Permendur. The magnet produces a field strength of about 1500 to 5000 Gauss in the region of mass analysis. The magnet has a gap width of about 0.5 to 5 cm. Preferably, the magnet and return assembly has a weight of less than about 20 kg; more preferably a weight in the range of about 8 to 10 kg.

In further embodiments: the system is constructed for scanning over a range from about m/e = 2 to 250 with unit mass resolution. Preferably, the cycloid analyzer is adapted for scanning over a range of about m/e = 2 to 150 by variation of a voltage in the range of about 0 to 300 volts, the analyzer includes low power consumption analyzer circuitry based on an operational amplifier. The system is constructed for the analysis of low molecular weight sample ions by magnetic deflection of the ions, without the application of electric fields in the analysis region. The detector means includes a Faraday cup and an electrometer for measurement of sample ions.

In still further various embodiments: the system is adapted as a self-contained system and further has a battery power supply and the ionization means, mass analyzer, vacuum means and detector include associated electronics enabling operation from the battery. The battery is a 12 volt battery. The system and electronics are constructed for a power consumption of about 30 watts or less, preferably for a power consumption of about 24 watts.

In various embodiments: the ionization means includes emission regulator circuitry, adapted to run from unregulated DC power, without the use of a transformer. The emission regulator includes a sensor means for detection of emission current and feedback circuitry for control of filament current in response to the detected emission current.

In still further various embodiments: the system includes separate switching means to enable shutting down of the ion source, cycloid mass analyzer, detector and vacuum means during periods of non-use. The vacuum means is adapted to maintain a pressure in the range of about $10^{-5}$ torr or lower. The vacuum means is an ion pump having a pumping speed of about 10 L/sec or less.

In further various embodiments: a heater means for degassing the analyzer, and a pressure gauge for monitoring the pressure in the inlet means are provided. The heater means and pressure gauge are adapted to operate from the battery.

Preferably, the system is constructed to have a weight of about 80 lbs. or less. The dimensions enable the system to be carriable on a back-pack.

In another aspect, the invention features a self-contained, hand-portable mass spectrometer system for operation in a location remote from line power. The system includes a sample inlet for receiving a sample of analyte molecules and an ion source for producing sample ions by ionization of the sample molecules. A cycloid mass analyzer is provided and adapted to receive and analyze sample ions over a range of masses. The mass analyzer has a means for inducing a variable electric field in the analysis region and a magnet assembly having a rare earth permanent magnet material with an energy product of about $20\times10^6$ gauss-oersteds or more and a light-weight magnet return for inducing a static magnetic field in the analysis region, oriented substantially normal to the electric field. The magnet assembly has a weight of about 20 kg or less. A detector is provided for detection of sample ions in the analysis region, and a vacuum means provided for maintaining a low pressure in the analysis region are provided. A DC power supply in the form of a 12 volt battery is provided, and associated electronics are constructed to enable the ionization means, cycloid mass analyzer, detector and vacuum means to operate from the DC power.

In yet another aspect, the invention features a portable mass spectrometer system having a sample inlet for receiving a sample of analyte molecules and an ion source for producing sample ions by ionization of the sample molecules. A cycloid mass analyzer is provided and adapted to receive the sample ions. The mass analyzer has a means for inducing an electric field in an analysis region and a permanent magnet material having an energy product of about $20\times10^6$ gauss-oersteds or more for inducing a static magnetic field in the analysis region oriented substantially normal to the electric field. A detector is provided for detection of the sample ions in the analysis region and a vacuum means is provided for maintaining a low pressure in the analysis region.

Other features are included in the following description.

DESCRIPTION OF THE PREFERRED EMBODIMENT

We first briefly describe the drawings.

DRAWINGS

Figure 3:
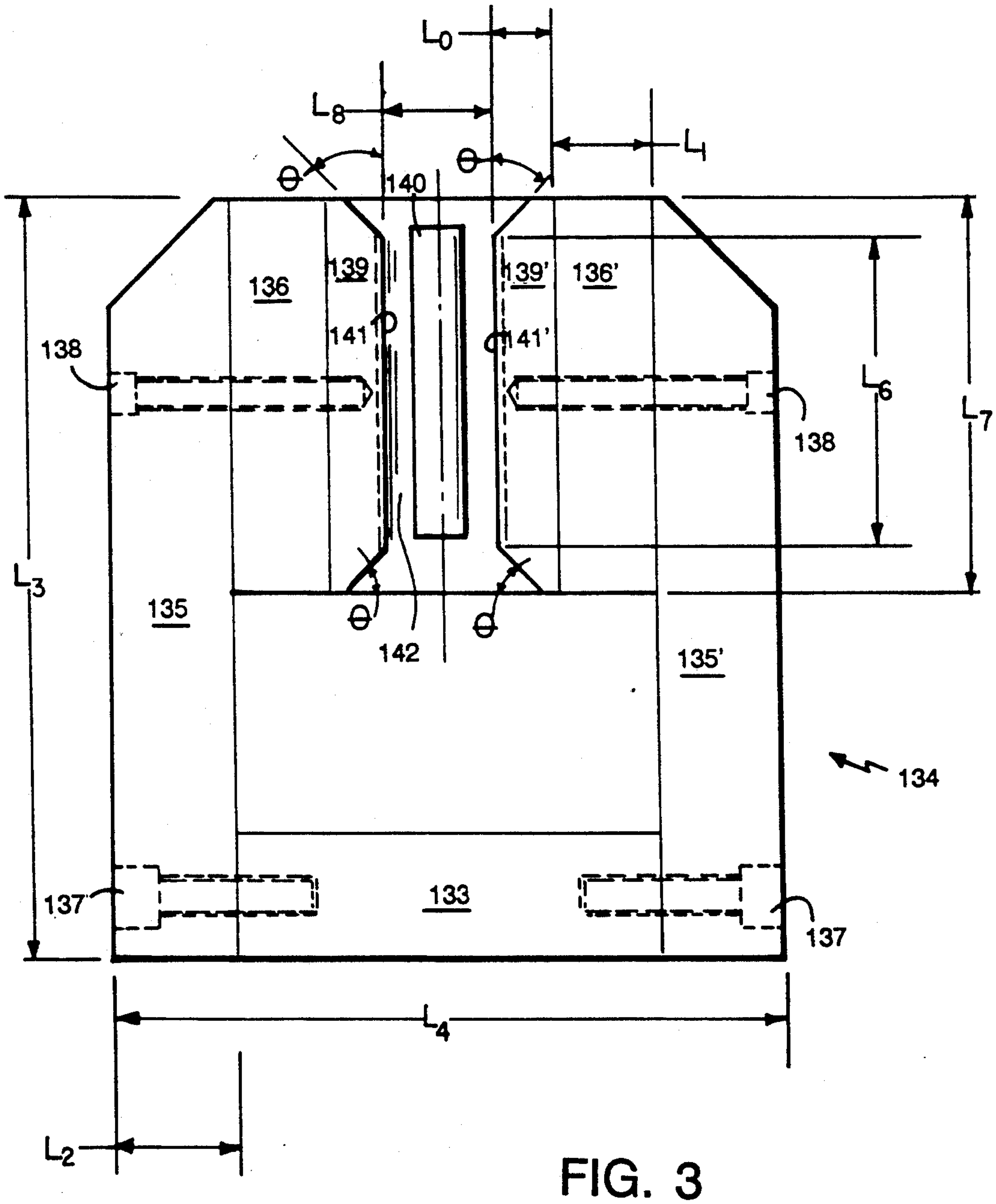
Figure 3A:
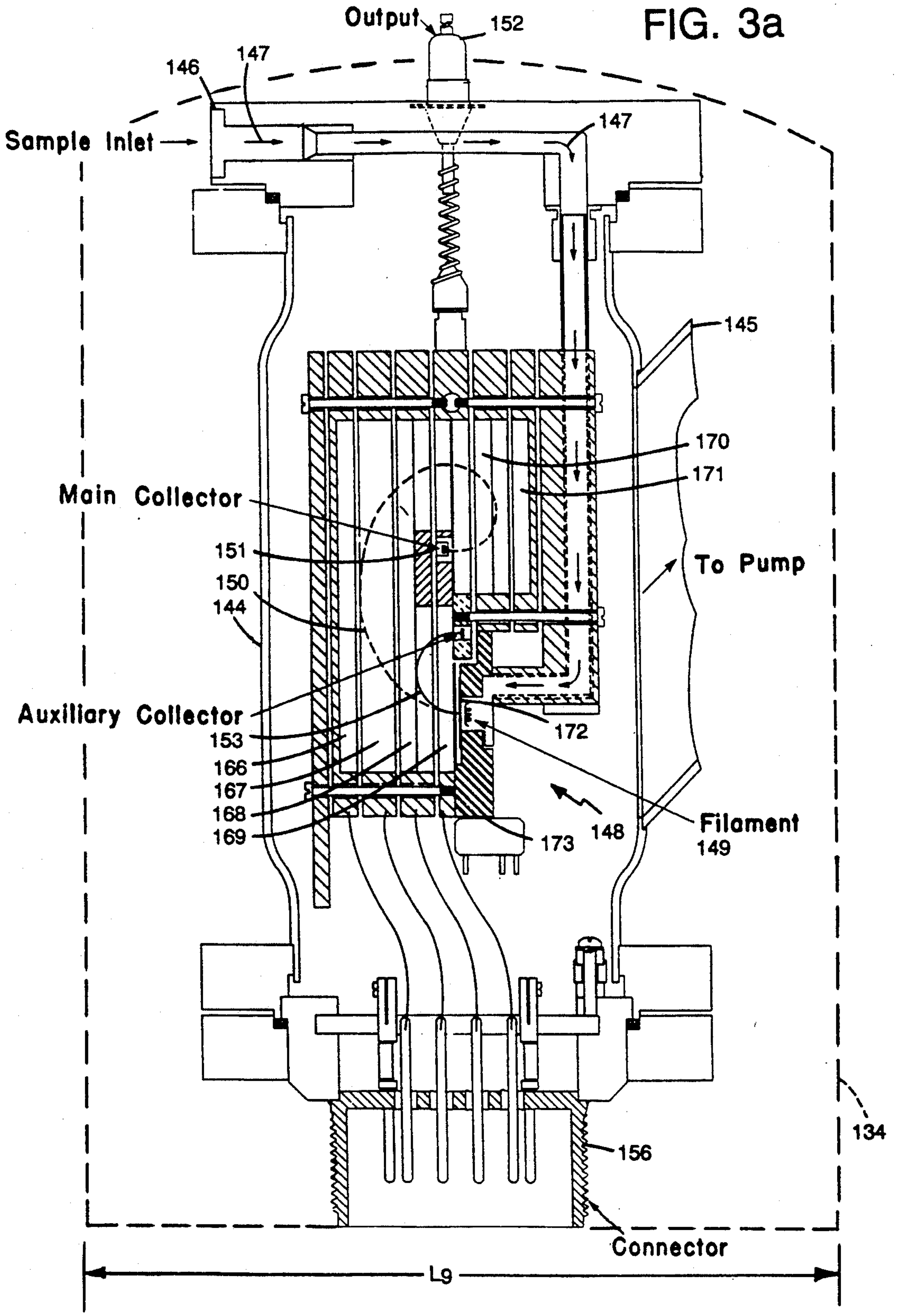

FIGS. 3–3*a* are a schematic of a permanent magnet and a cycloid tube according to the invention, respectively.

Figure 2:
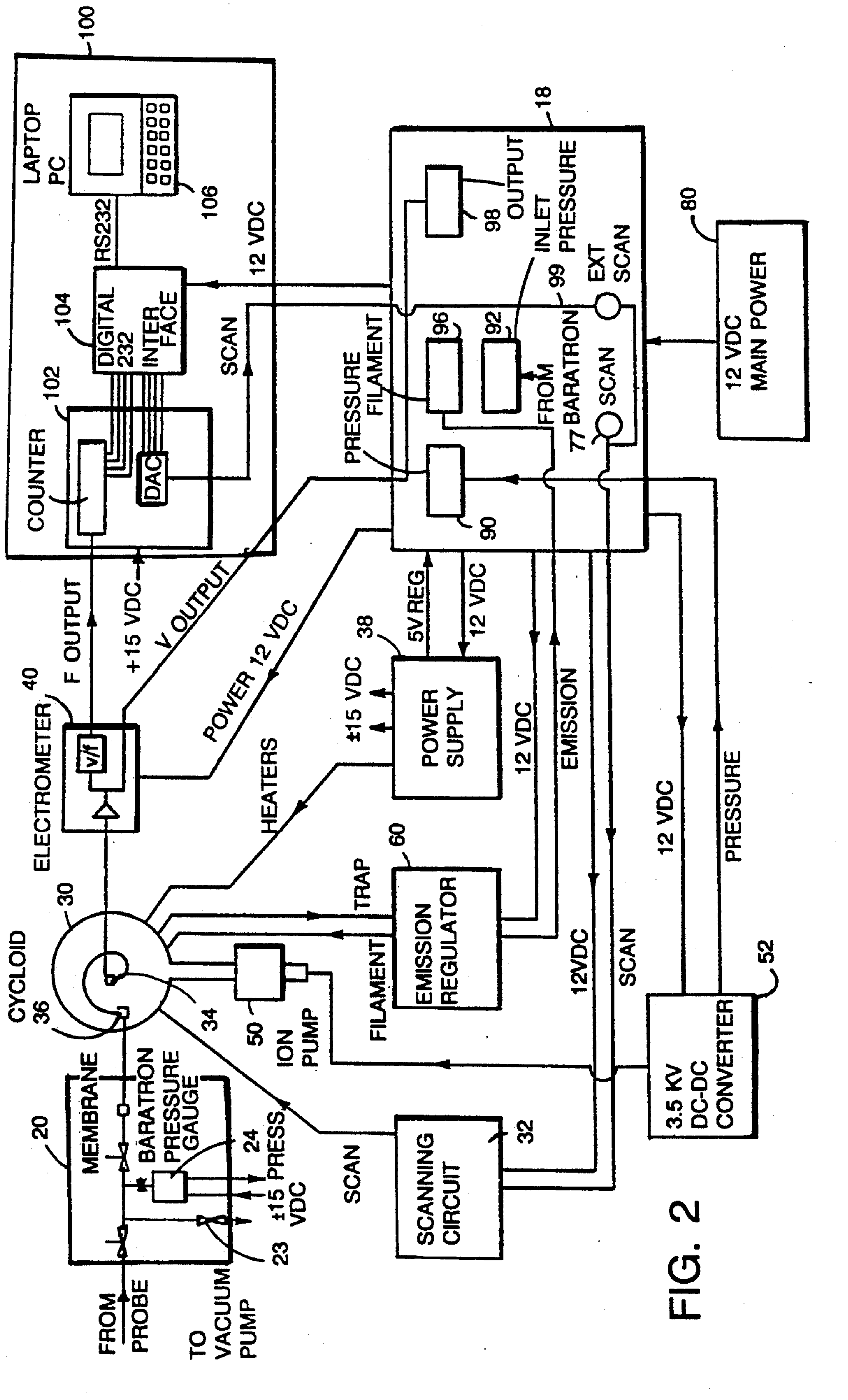
FIG. 2 is a system diagram of a mass spectrometer according to the invention.
Figure 4:
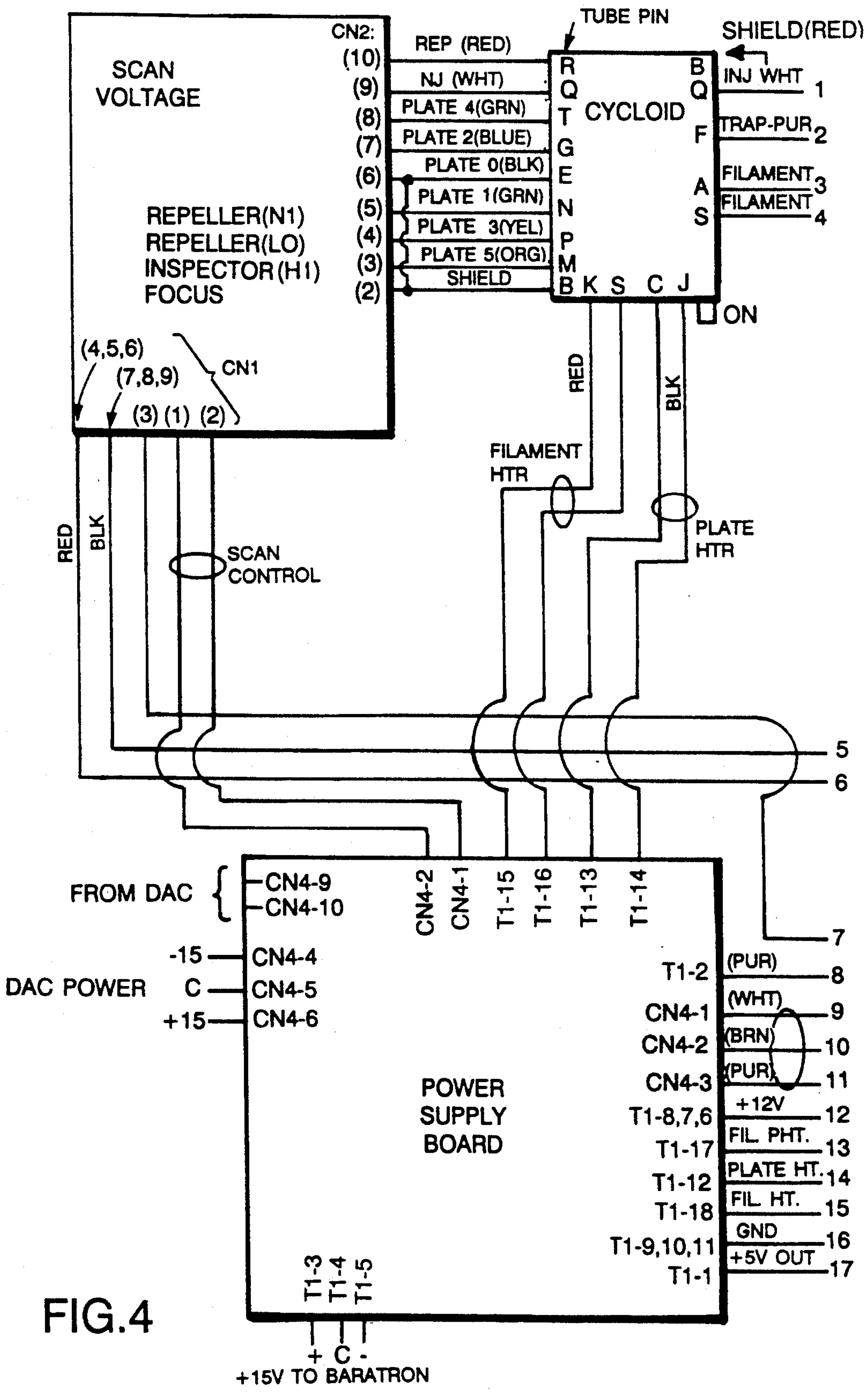
Figure 4A:
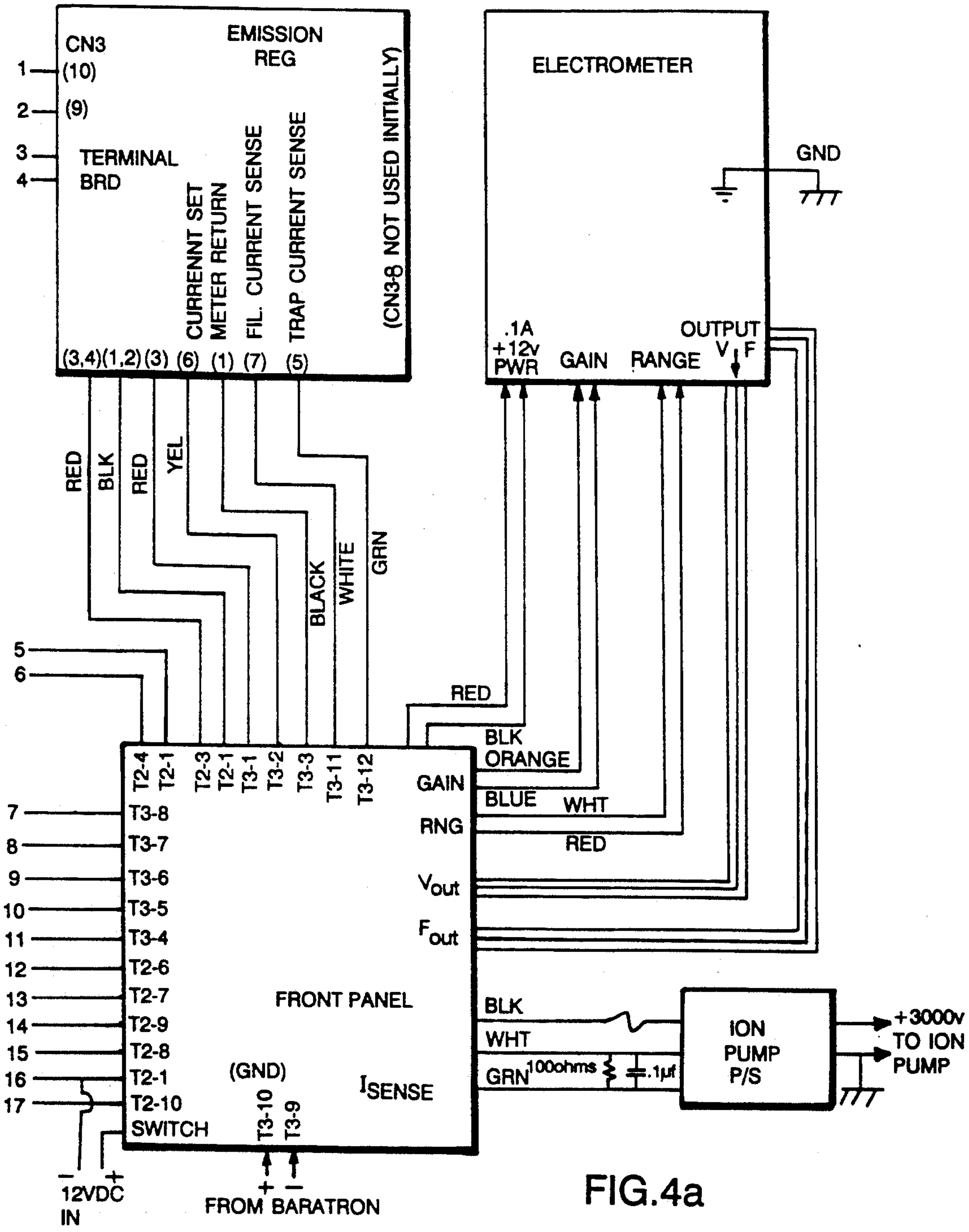

FIG. 4–4*a* is an overall wiring diagram for a mass spectrometer system, as in FIG. 2.

Figure 5:
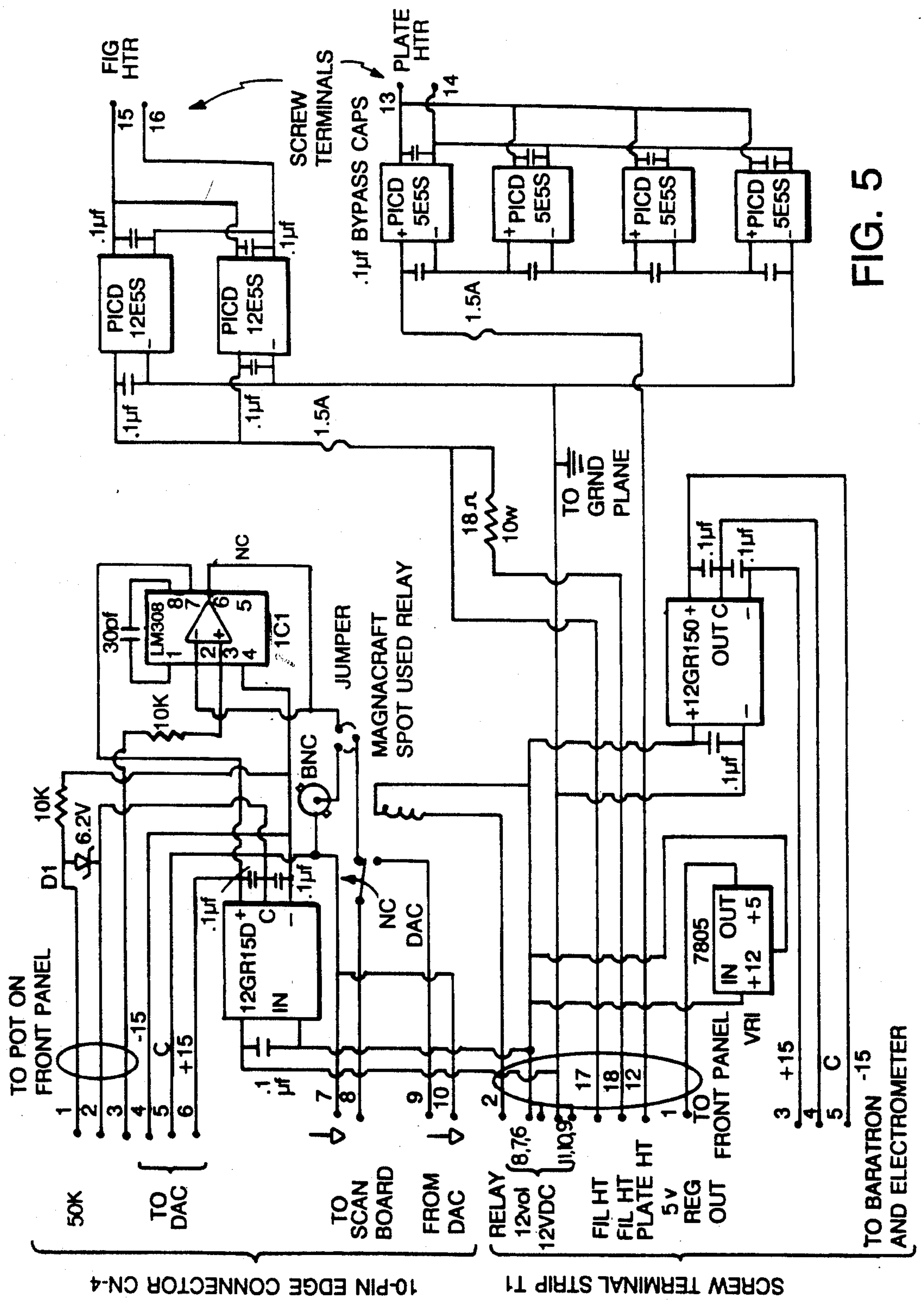

FIG. 5 is a circuit diagram of the power supply board in the wiring diagram, FIG. 4.

Figure 6:
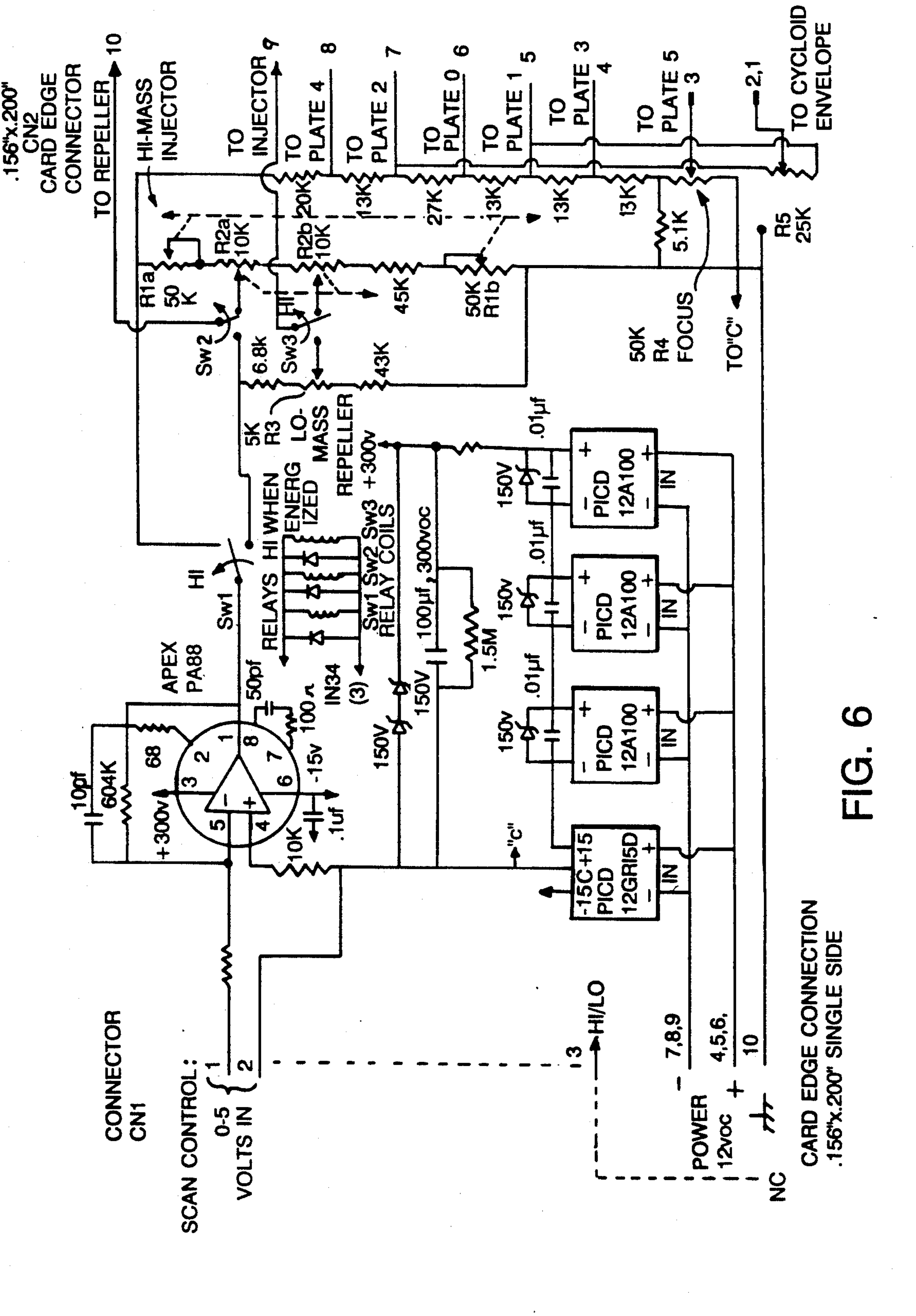

FIG. 6 is a circuit diagram for the scanning voltage supply in the wiring diagram, FIG. 4.

Figure 7A:
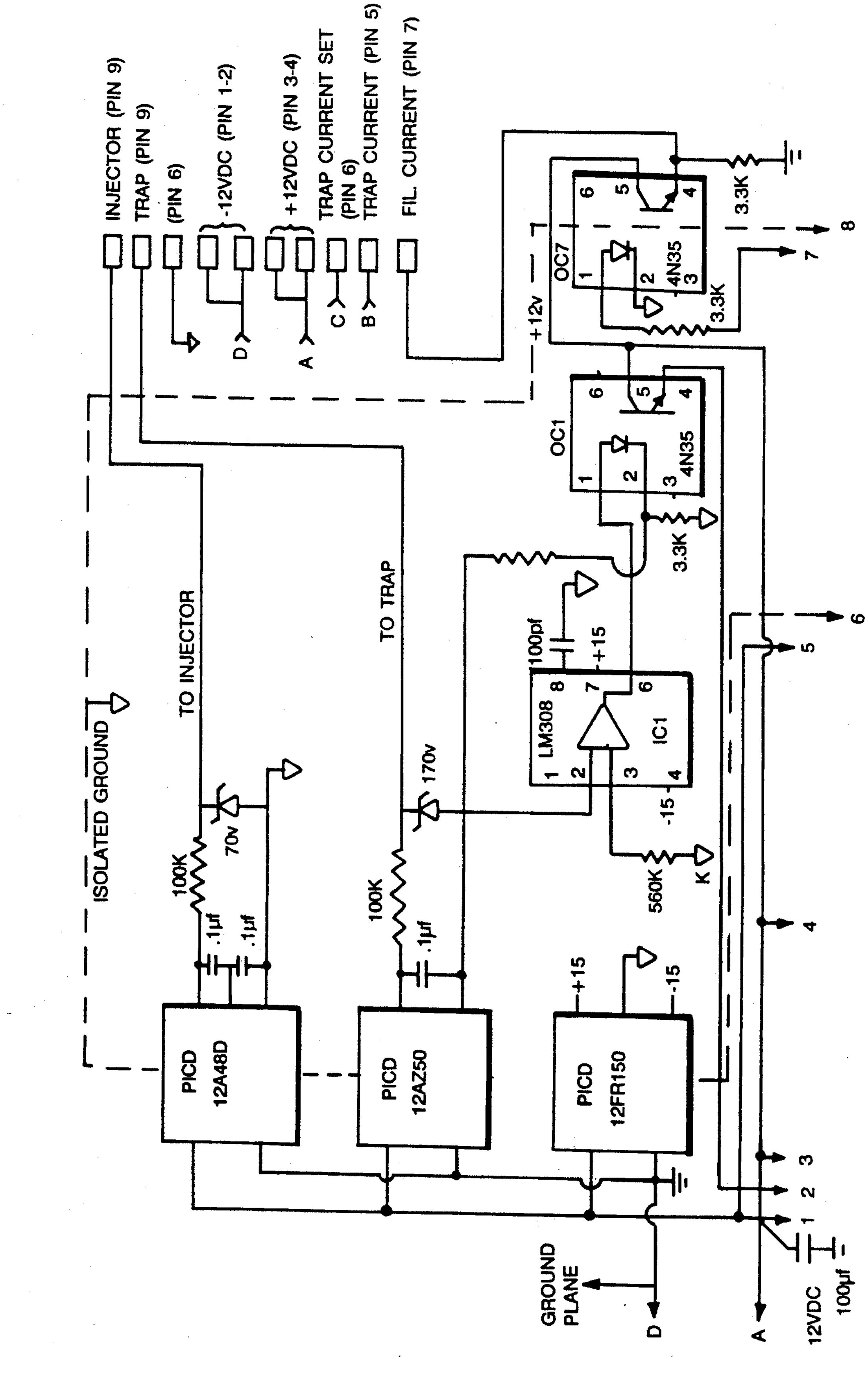
Figure 7B:
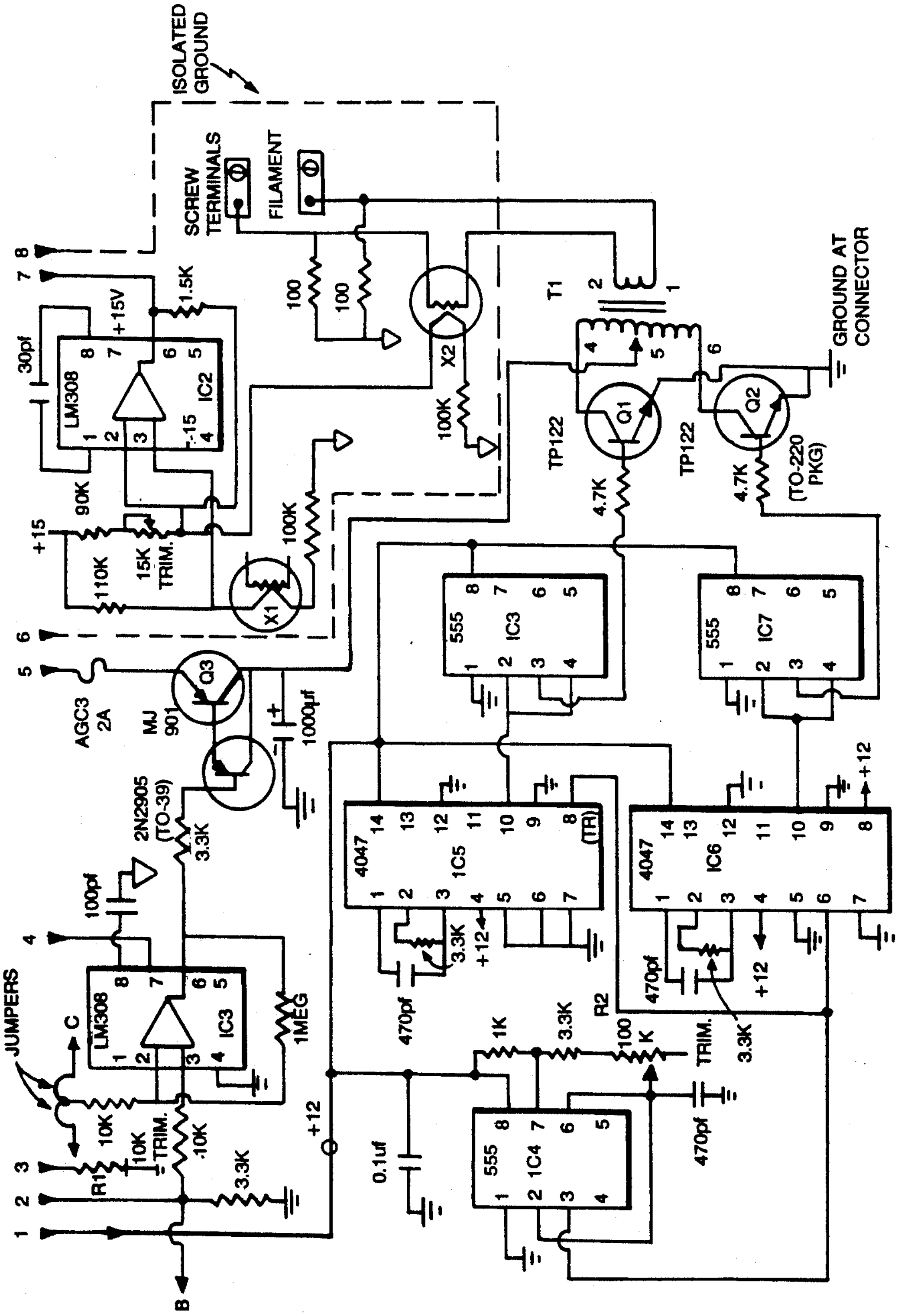

FIG. 7–7*b* is a circuit diagram for the emission regulator in the wiring diagram, FIG. 4.

Figure 8:
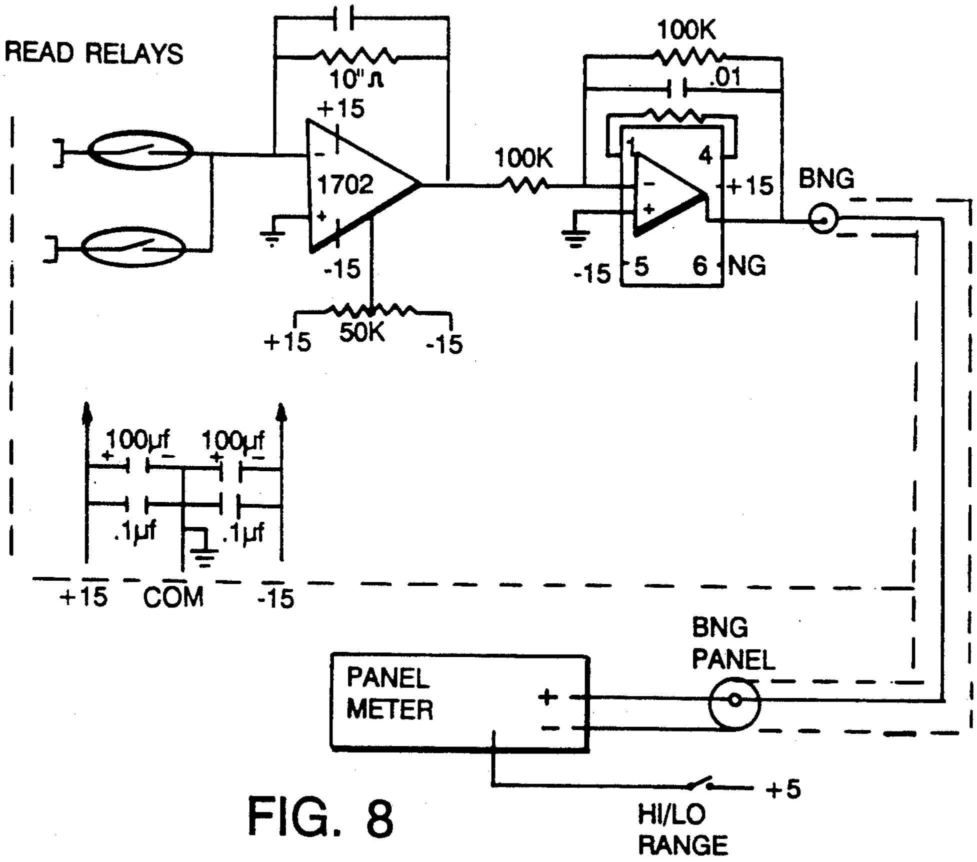

FIG. 8 is a circuit diagram for the electrometer in the wiring diagram, FIG. 4.

Figure 9:
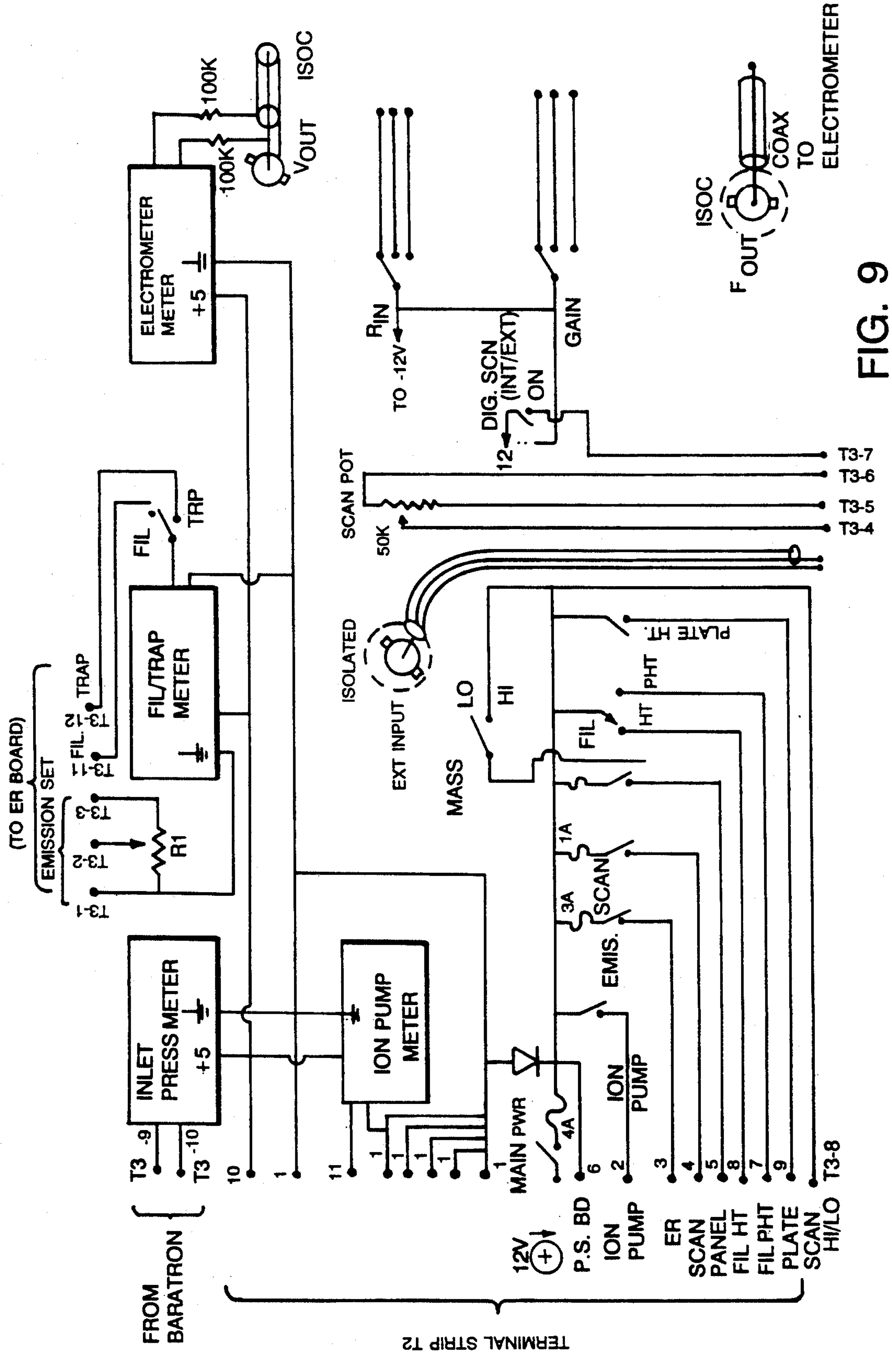

FIG. 9 is a front panel circuit diagram for the wiring diagram, FIG. 4.

Figure 10A:
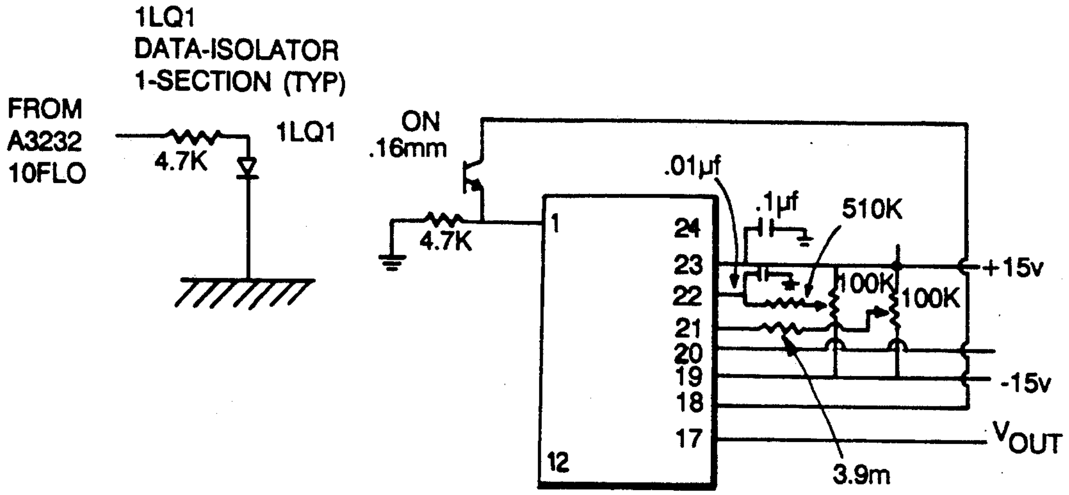
Figure 10:
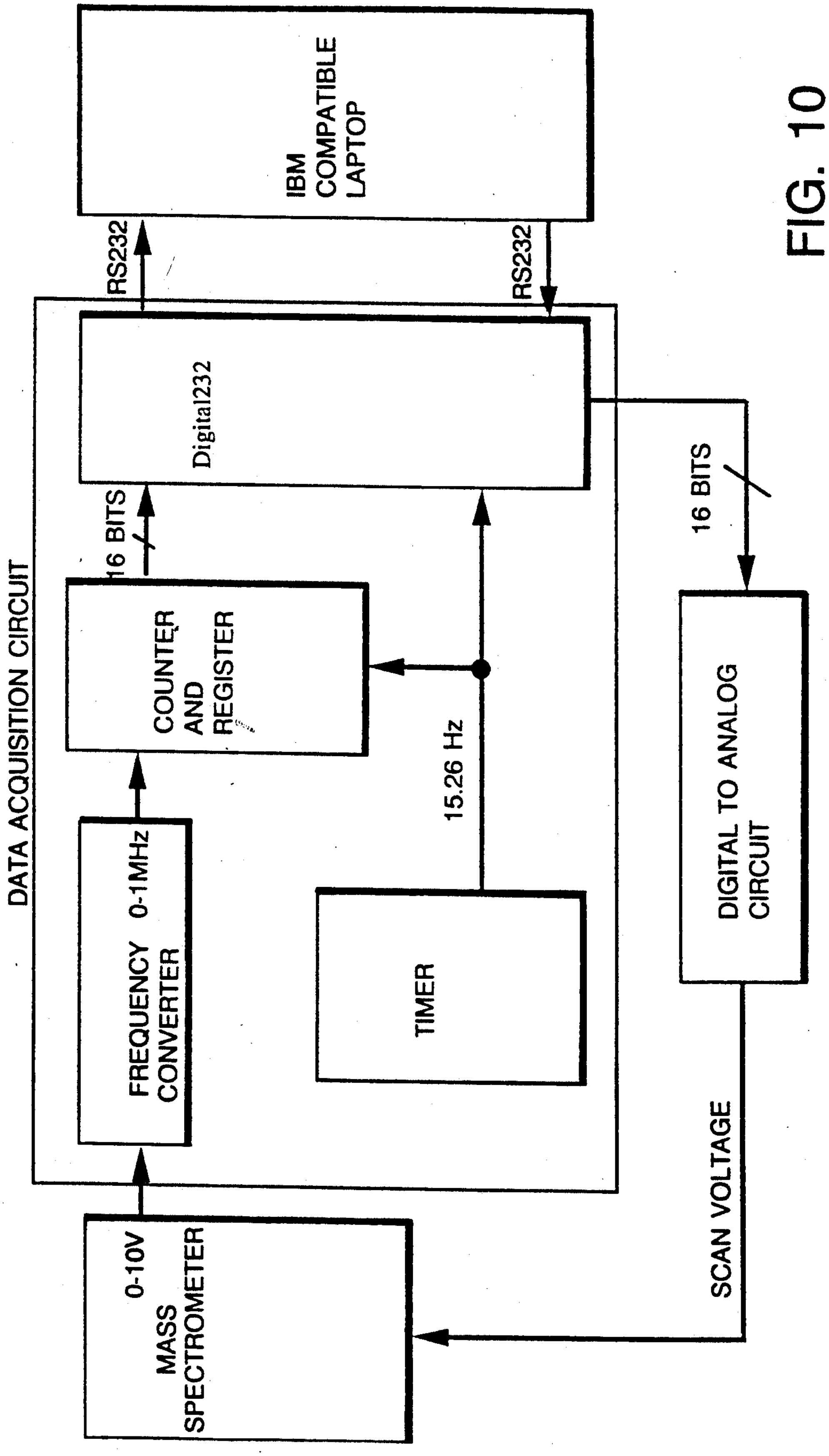

FIG. 10–10*a* is a circuit diagram of a computer interface for use with the spectrometer system, as in FIG. 2; while FIG. 10*a* illustrates a typical bit in the operation of the DAC chip.

Figure 11:
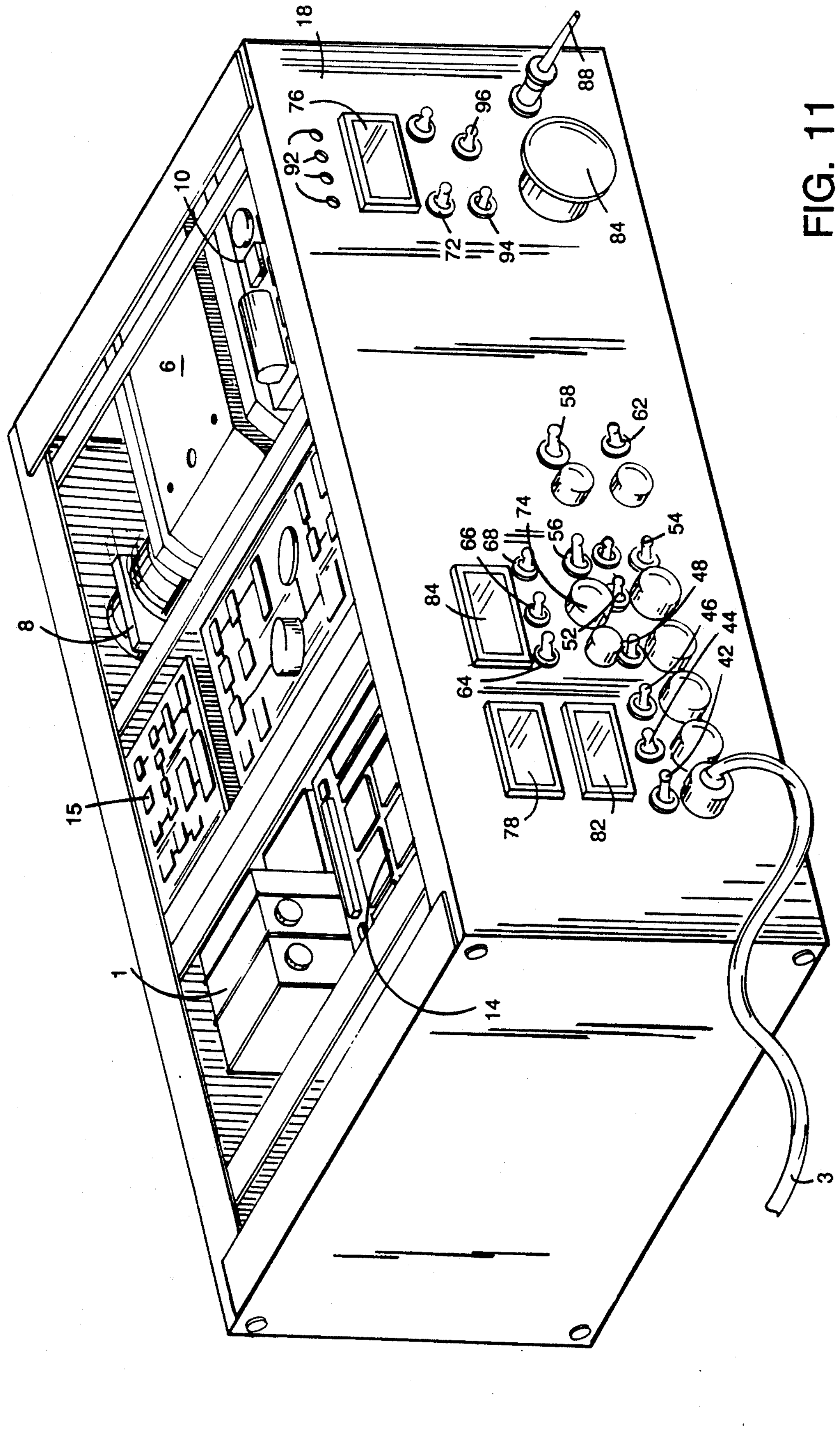

FIG. 11 is a perspective view of a preferred embodiment of a mass spectrometer system, cut away to show the arrangement of components.

Figure 12:
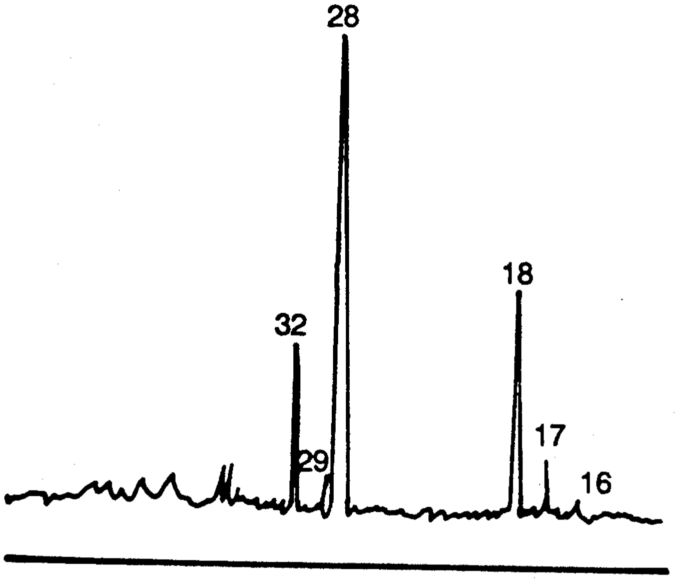
Figure 12A:
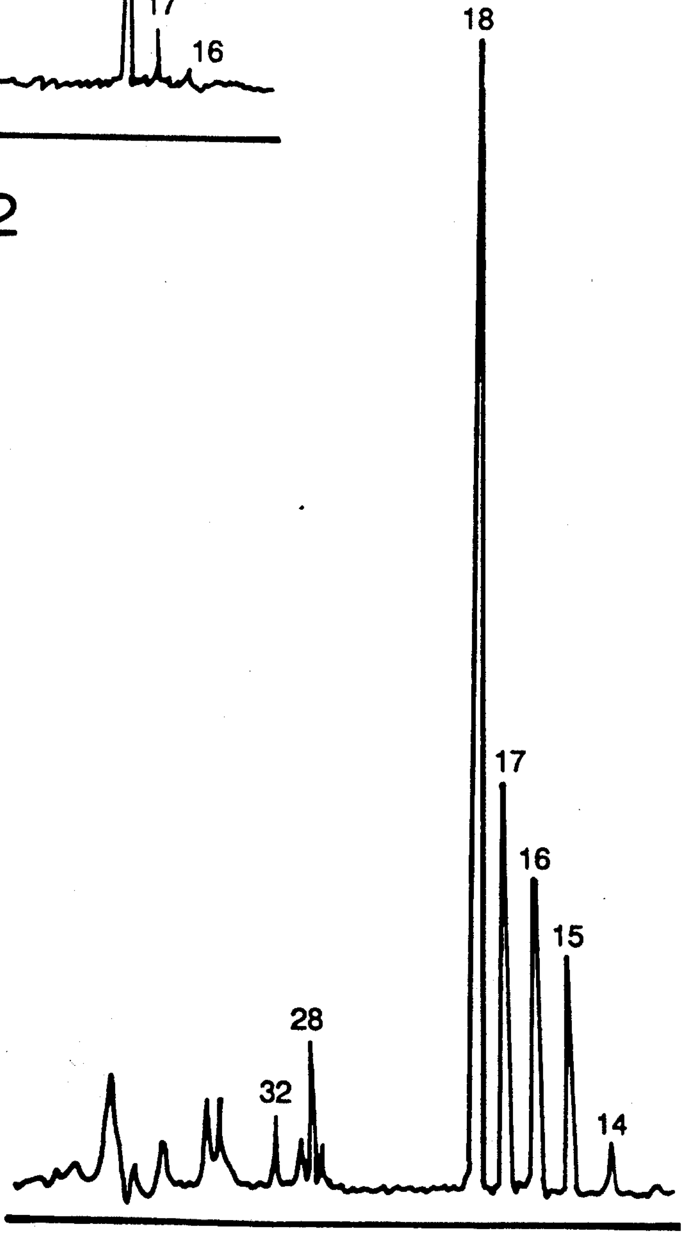

FIG. 12–12*a* are spectra from the spectrometer system.

STRUCTURE

Figure 1:
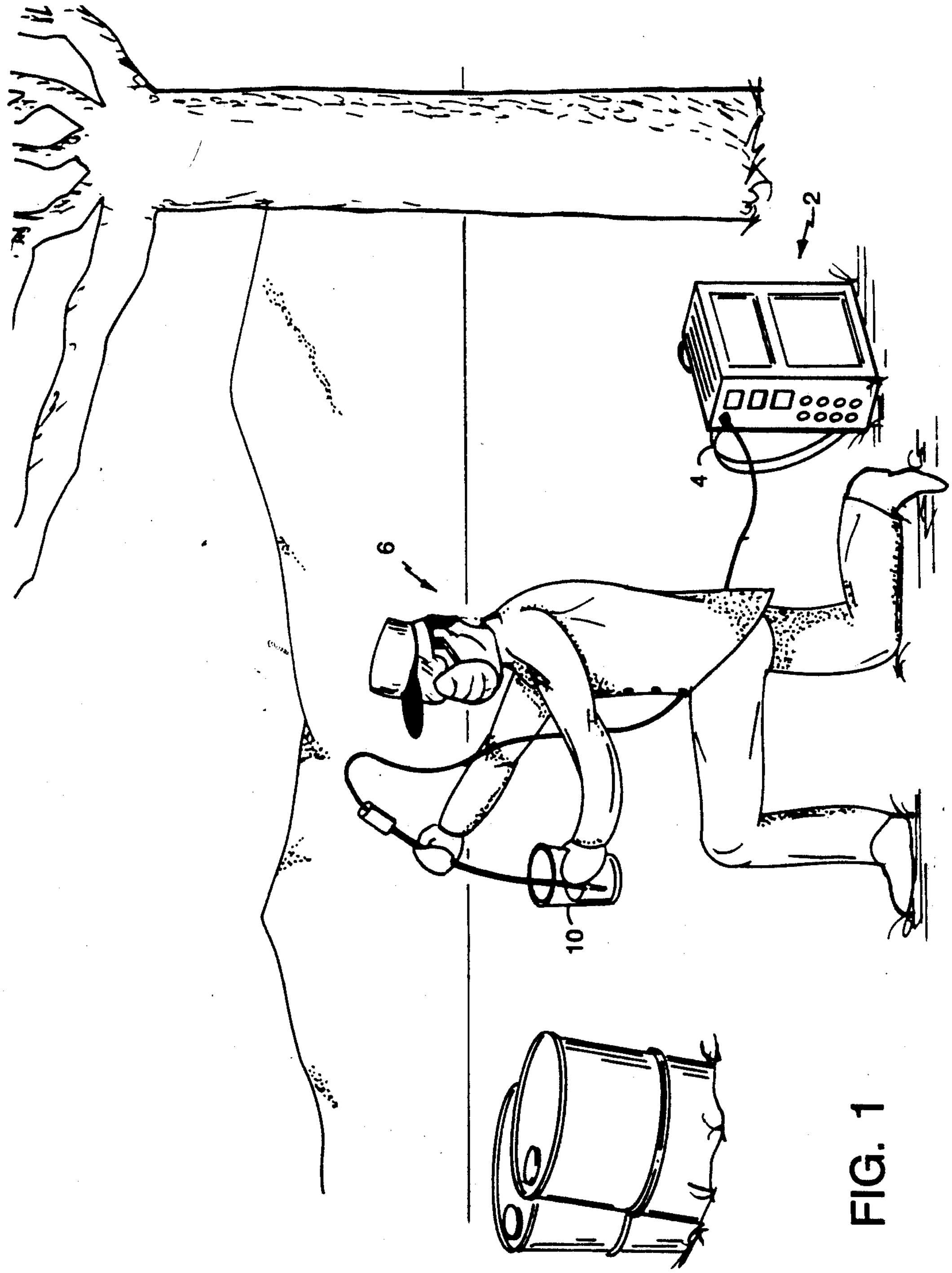
FIG. 1 is a schematic of the portable mass spectrometer according to the invention in use in a remote area.

Referring to FIG. 1, a self-contained, light-weight hand-portable mass spectrometer system 2 is shown mounted on a back-pack 4 such that it can be hand-carried into the field to a remote region, away from line-power. The operator 6 places the probe 8 into a sample 10 of soil or the like and operates the system 2 to obtain a mass spectral analysis.

The system components are cooperatively constructed so that the apparatus is light enough, e.g., only about 70 lbs, to be hand-portable, i.e, carried into the field by a single operator, yet is capable of performing analysis over a range of masses, e.g., m/e = 2 to 150 amu, and at sufficient sensitivity that complex samples from, for example, a hazardous waste site may be studied. As will be further discussed below, the system employs a cycloid mass analyzer operating under vacuum that has a light-weight, high energy product permanent magnet. The system is also self-contained, i.e., it carries its own battery power supply, e.g., a 12 volt battery power supply. In many embodiments, the system can operate for a number of hours without the benefit of external power or vacuum systems.

Referring now to FIG. 2, a system diagram of the mass spectrometer system 2 is shown. All of the system components (with the exception of the lap top computer 106) are powered from a 12 volt DC battery main power supply 80, including the cycloid mass analyzer 30 having associated scanning circuit electronics 32 adapted to enable operation from the battery power supply 80. The scanning circuit electronics 32 take input from a scan control knob 77 on the control panel 18 for manual operation or from a computer interface such as a data system 100. Within the cycloid analyzer 30 is a Faraday cup 34 for collection of sample ions. An electrometer 40, adapted to operate from power derived from the battery supply 80, is provided for measuring the detected ions and reporting the detected signal to the meter 98 on the control panel 18 or optionally data system 100. An ion source 36, including an electron ionization (EI) means and ion transport optics is provided in the cycloid analyzer for ionizing sample molecules and directing them into the cycloid tube analysis region. An emission regulator 60, also including associated electronics for operation from the battery 80 detects and regulates the source current and reports the filament current to the gauge 96 on the panel 18. The system further includes an ion pump 50 for maintaining a low pressure in the cycloid analyzer, typically in the range of $10^{-5}$ torr. The ion pump 50 is driven from the battery supply 80 through electronics 52, including a DC-DC converter. The pump 50 and electronics 52 are constructed to allow measurement of the analyzer pressure, which is reported to the panel gauge 90. An inlet 20 receives a sampling probe that delivers sample molecules to the ion source 36. A suitable probe for environmental measurements in soil is constructed from a 1-meter length of stainless steel tubing, (0.022 inch O.D.) over one end of which a 5-mm length of silicone rubber tubing (0.024 inch O.D. $\times$ 0.012 inch I.D.) is fitted. The open end of the tubing is sealed with a 1-mm length of 0.020 inch diameter copper wire, leaving a 1-mm length of silicone rubber tubing which is exposed both to the external environment and to the internal volume of the stainless steel tube. The inlet system includes an isolation valve 22 for isolation of the system from the probe and a valve 23 for connection with an external roughing pump for initial pump down, before the system is taken afield. Alternatively, the inlet system may be rough-pumped via a small, self-contained, room-temperature absorption pump such as an evacuated canister containing a molecular sieve material. The absorption pump may be placed in the spectrometer housing and carried afield and regenerated between field trips using an external vacuum pump. A Baratron® capacitance manometer pressure gauge 24 (model 122A, available from MKS Instruments, Inc., Andover, Mass.) having a resolution of about 0.2 torr is connected to the inlet manifold by a valve 25 which may be closed to reduce inlet system volume under conditions where appropriate inlet pressures (generally, less than a few microns of mercury) are known to exist. The Baratron® is also powered from the battery supply 80 via a DC to DC converter. The gauge 24 reports the output to the panel gauge 92. A stainless steel frit is placed in the inlet line leading to the mass analyzer for removing particulates and the like. The mass analyzer also includes cycloid tube heaters (FIG. 3) for degassing the analyzer that have power supply electronics 38 for operation from the battery supply 80.

An (optional) data analysis unit 100 receives output from the electrometer 40 and includes a counter circuit 102 and a digital interface 104 to a lap top computer system 106 (powered from its own battery). The interface 104 is also adapted for operation from the battery supply 80. The system 100 may also be used to control scanning, the scanning voltage being controlled by a digital to analog converter (DAC) operated by the computer system.

The cycloid type mass analyzer is a particularly advantageous aspect of the portable mass spectrometers of the invention. The cycloid design achieves both direction and velocity focussing in a compact analyzer. From a control standpoint, for scanning over a range of masses of environmental interest, the cycloid analyzer accomplishes mass scanning simply by varying a single voltage supply, to vary the analyzer electric field and employs relatively low voltages and low energy consumption. For example in the preferred embodiment, the analyzer scans the mass range of $m/e = 2$ to 150 by variation of a low voltage of about 0–300 V, thus simplifying the control circuitry such that it may be based on an operational amplifier. The compactness of the analyzer region requires that only a small volume be evacuated to low pressures and further the short travel path of the sample ions to the detector allows somewhat higher than typical pressures, around $10^{-5}$ torr to be employed in the analyzer without substantial degradation of sensitivity or resolution. Both of these factors enable the use of smaller vacuum pumps at lower pumping speed which reduces the bulk, weight and power consumption of the system. The short travel path of the ions also enhances the ruggedness of the system.

The cycloid mass analyzer need not be fitted with a sensitive electron multiplier detector which are generally bulky, complex and suffer from mass discrimination effects. The intrinsic linearity and minimal mass discrimination effects of a Faraday cup detector preferably employed in the present systems, are particularly advantageous for measurements made in remote regions. In the systems of the invention, highly stable and reproducible mass spectra with minimal mass discrimination are obtained, which enables the data to be mathematically analyzed, for example, using the computer 106 of the data system 100, to determine the presence of multiple species in a single spectrum, as is often the case in environmental type samples. The system therefore may eliminate the need for bulky pre-separation apparatus such as a gas-chromatograph which separates the molecular species prior to analysis and thus does not impose the requirement of stable spectral peak intensities. An example of a mathematical separation technique is described in, for example, Doherty, MS Thesis (MIT 1988).

To achieve portability, preferably hand-portability, yet obtain the high magnetizing force needed in the analyzer, rare earth magnetic materials, preferably having an energy product of about $20\times10^6$ gauss — oersteds or more, more preferably in the range of about $30\times10^6$ gauss-oersteds or more are used as the permanent magnet material. High magnetic energy product enables relatively high fields in the magnet gap to be obtained with the use of relatively small amounts of magnetizing material, thus reducing the weight of the magnet assembly. The compact design of the cycloid analyzer enables the use of such materials, which are generally pressure-formed composites, available in relatively small physical sizes. In the preferred embodiment, a neodymium-iron alloy is used as the magnetic material, together with mild steel pole pieces for the magnet return path. The total weight of the magnet assembly is about 9 kilograms. It will be understood that other low-weight, high energy product rare earth alloys might also be employed, such as samarium-cobalt alloys. High energy product magnetic materials are discussed in Moskowitz, L.R., 1976, "Permanent Magnet Design and Application Handbook" (Cahners Books Int'l, Boston, 355 pp.). Vanadium Permendur may also be used as a preferred low-weight magnet return material. The use of high energy product magnetic materials reduces the volume of the magnet further contributing to portability. In the preferred embodiments the dimensions of the magnet assembly are about two-thirds that of conventional cycloid machines, and weigh about less than one third of conventional cycloid magnets.

In preferred embodiments, the cycloid mass analyzer has a mass range of $m/e = 2$ to 150, with unit mass resolution at about $m/e = 44$, preferably $m/e = 150$ and operates with a magnetic flux density from about 3,500 to 4,000 gauss in a magnet gap of about 2.6 cm. For values of m/e between 2 and 12, the analyzer includes an auxiliary Faraday cup collector (FIG. 3) arranged such that, when the electric field is reduced to zero, the instrument behaves as a 180° magnetic sector analyzer (some power is also conserved when only low mass analysis is needed) and scanning is achieved by variation of the source voltages. The sensitivity of the analyzer is about $1.7\times10^{-4}$ A per g/s of Argon with about 20 $\mu$A of ionizing current. The system performance is therefore adaptable for analysis of a wide range of samples which might include environmental samples containing low concentrations (PPM range) of hydrocarbons such as benzene, xylene, and toluene (BXT), or halogenated species such as chloroform, trichloroethane (TCA), trichloroethylene (TCE), or perchloroethylene (PCE). Such materials are commonly in use in fuels or solvents and frequently appear as environmental contaminants. The system is also adaptable to measuring gasses such as oxygen, carbon dioxide, methane and hydrogen, and is therefore valuable in environmental research where, for example, natural chemical cycles or the generation of "greenhouse" gases must be understood.

The mass spectrometer system operates from a 12 volt 7 amp, (10-hour-rate) DC main power supply. The approximate power requirements with the mass spectrometer and ion pump operating with some sample flow and excluding a microcomputer interface is about 2 amps at 12 volts, or roughly 24 watts. The system can run continuously in this mode for about 2.5 hours (at this discharge rate, the battery pack capacity must be somewhat derated). For operation where subsystems (such as the emission regulator) can be shut-off part of the time, much longer operation, as long as 4 hours or more, may be possible. Separate power switches are provided on the control panel for each subsystem of the mass spectrometer so that a subsystem not actually in use may be shut down to conserve power. For example, between measurements or while waiting for a vapor flow to reach a steady state value, it may be appropriate to shut down the scanning circuitry or the emission regulator. All components but the ion pump may be powered down between samples to minimize power consumption. In alternative embodiments, such switching may be automated through the use of feed-back loops. In addition, batteries can be stocked in the field. The system may also be adapted for operation from a motor vehicle with an external 12 volt power supply supplied through a cigarette lighter plug.

Referring now to FIG. 3, a side-view schematic of a cycloid analyzer for use in the mass spectrometer according to the invention is shown. The cycloid tube 140 is located in the gap 142 between the poles 139, 139' of a magnet assembly 134 which also includes a rare earth magnetic material 136, 136' which are disc shaped pieces (diameter, about 3.5 inch) formed from the high-energy-product permanent magnetic material neodymium-iron alloy (supplied by Arnold Engineering of Marengo, Ill.). The pole pieces 139, 139' have a width $L_0$ of about 0.5 inches. The pole faces 141, 141' are sculpted (dotted line) and formed with angular contours ($\Theta=45°$). The poles have outer exposed lengths of $L_6$ about 3 inches and inner lengths that meet with the magnetic material 136, 136' of $L_1$ of about 3.5 inches. The magnet 136, 136' have a width $L_1$ of about 0.93 inches. The magnet assembly is provided with a mild steel alloy return (alloy C1018). The return path includes return pieces 133, and 135, 135'. Pieces 135, 135' have a width $L_2$, about 1.1 inches. The overall length of the magnet assembly is $L_3$, about 6.75 inch. The overall width of $L_4$ is about 5.0 inch, and the overall depth (and the diameter of the magnetic material discs 136, 136') is $L_9$ (FIG. 3*a*) about 3.5 inches. The magnetic return path pieces are assembled by the use of steel bolts 137 which are of dimensions $\frac{3}{8}$ inch by 1 $\frac{1}{2}$ inch long. Bolts 138, which allow assembly of the poles 139, 139' magnet pieces 136, 136', and return pieces 135, 135' are 2.25 inch by 0.25 inch. The magnet provides a gap width of $L_8$, about 2.6 cm. In the embodiment described, a minimum magnetic field of about 3500 gauss is provided at the center of the gap. The magnet and return weigh about 9 kg.

Referring now to FIG. 3*a*, the analyzer 140 includes a vacuum envelope 144 which houses the cycloid tube and positions it through a connector 156 between the poles of the magnet. The analyzer tube may be constructed by modifying the tube from a commercial machine (such as a Consolidated Engineering Corporation formerly of Pasadena, Calif., model 21-620, or a model 21-614 in which case gas inlet tube 147 must be added). In the preferred embodiment, the envelope is constructed by cutting off the main vacuum line from the vacuum envelope used on a CEC 21-620 mass spectrometer system and welding on a 2 $\frac{3}{4}$ inch knife-edge flange (not shown). The cycloid tube includes a string of electric plates 166–171 connected along a voltage divider and arranged to induce an electric field substantially normal to the magnetic field provided by the above-described magnet assembly. The mass range, from about m/e = 2 to 150, is scanned by applying of a few volts to 300 volts DC to the string of plates within the cycloid tube. A potentiometer (R5 of FIG. 6) is used to adjust the electrical potential of the plate voltage supply with respect to ground (device body). This is advantageous in that, with the electrometer being referenced to ground, it is possible to avoid capacitively coupled spurious signals as the plate voltage changes during scanning.

Sample molecules are received from an inlet 146, and, following the path of arrows 147, are directed to the ion source region 148, which includes a filament 149, emitting electrons to ionize the sample molecules, thus forming sample ions. The sample ions are directed, through the electrostatic fields of the repeller plate 172 and rejector plate 173, into the field region of the analyzer. The source also includes a trap for measurement of the ion current and source heaters for degassing (both not shown). For analysis of ions in the range above about 12 amu, the ions of proper m/e introduced to the field region follow a spiral path 150 under the influence of combined electric and magnetic fields to the main Faraday cup detector 151, the signal from which is coupled through output 152. Variations of the electric field by variation of the source and plate voltages enables mass scanning. For analysis of relatively low mass ions, in the range below about m/e = 12 amu, the electric field plates are disabled and the ions deflected solely under the influence of the magnetic field, following an arc-path such as 153, and being collected by the auxillary Faraday cup detector 154.

Referring now to FIG. 4–4*a*, an overall wiring diagram of the system is shown, illustrating in detail the electrical interconnection of the electrical circuit components, including the power supply board 80, scanning circuit 32, cycloid mass analyzer 30, emission regulator circuit 60, electrometer 40, ion pump 50 and front control panel 18. Each of these items is discussed individually, as follows.

Referring to FIG. 5, a diagram of the power supply board is shown. As discussed above, the spectrometer system operates from a 12 volt battery power supply (MP 802T, SAFT America Inc., Vakdesta, Ga.). The power supply electronics include four PICO model 5E5S DC-DC converters with outputs paralleled and inputs in series, to convert 12 volt DC power to the low voltage and high current required by the plate heaters. Two PICO model 12E5S DC-DC converters are paralleled to provide 5-volt power for the filament heater. A PICO 12GR15D DC-DC converter provides ≊15 volts for the Baratron® pressure gauge and the electrometer. A second PICO 12GR15D converter provides power for the digital-to-analog converter of the optional computer interface and for op-amp ICI, whose output drives the scanning circuitry. For manual operation, output of IC1 is controlled by the SCAN potentiometer located on the front panel (FIG. 9), which is supplied with a stable 6.2 volt DC voltage regulated by Zener diode D1. When used with the computer interface, IC1 is controlled by output of the DAC. The power supply board also supplies regulated 5 volt power for the panel meters, throuqh voltaqe regulator VR1.

Referring to FIG. 6, mass scanning is provided by scanning circuit 32 that is based on a single high voltage operational amplifier (Apex Model PA88). The circuit provides a 0–300 volt output when a 0–5 volt control signal is applied. DC-DC converters 162, 163, 164, 165 and a Zener regulator provide operating power to the op-amp 160, and the output at SW1 is divided along a resistor chain which provides appropriate voltages to each of the field electrodes plates 0–5 of the cycloid as well as the injector plate 9 and the repeller plate 10. (In an alternative design, the Zener diode regulator may be replaced by a series regulator circuit, to further save electrical power.) The control signal delivered through pins 1 and 2 of connector CN1 is provided via IC1 of the power supply board (FIG. 5) either by a 0–5 volt source controlled from the front panel or output of the digital to analog converter (DAC) associated with a microcomputer interface. Output of the Apex PA88 op-amp is also made available to a connector on the front panel for use, if desired, with an external x-y recorder. As discussed, in the low mass range, 2 to 12 AMU, the system uses conventional 180° magnetic sector geometry. Relays SW1, SW2 and SW3, controlled by a switch on the front panel, adjust the system to the high mass range and the scanning voltage is applied across the plate string. In the low mass position, the machine behaves as a simple 180 degree mass analyzer. While the system does not act as a double focusing analyzer in this mode, the resolution required to separate adjacent masses is sufficiently low that analysis may be carried out. Furthermore, this feature provides a power-saving advantage in that there is less draw from the scanning circuitry on the 12 volt battery supply.

Referring now to FIG. 7*a*–*b*, the power-handling portion of this emission regulator was designed to run directly with unregulated 12 volt power in order to minimize power consumption and simplify circuitry without the need for energy inefficient and heavy transformers. In general, filament power for the analyzer is provided at approximately 60 khz by a push-pull pair of Darlington power transistors Q1 and Q2, operating through a standard toriodal transformer (Pico#67490, Custom-wound transformers are also available). On-time of each power transistor is constant, and maximum filament current is controlled by varying the frequency of the driving circuitry. Emission current regulation is provided by a trap current sensor (amplifier Ic1, an LM308 op-amp) which is coupled, via optical isolator OC1, back to the power circuitry; this feedback, together with a reference voltage from the trap current set potentiometer R1 or a similar potentiometer on the front panel, is used to control series pass transistor Q3. Normally, the circuitry is adjusted so that the desired emission current is achieved with only a small (1–2 volt) drop in the series pass transistor. (In other embodiments, emission regulation may be provided directly by controlling the duty cycle of the invertor circuitry, thereby achieving additional power savings. The PICO 12A250 and 12A48D DC-DC converters are used to provide the necessary electron accelerating voltage and trap voltage for the analyzer source. Simple Zener diode voltage regulation is employed for both voltages. In addition to the emission current signal, the emission regulator incorporates a filament current sensing circuit consisting of thermistors X1 and X2 and op-amp IC2 whose output is coupled to a panel meter via optical isolator OC2. An advantage of the circuitry provided is power savings. The inverter circuitry is operated at near ground potential; only the secondary of the transformer is floating at above ground, a feature which permits easier monitoring and testing of the circuitry.

The emission regulator circuit includes a type 555 timer chip, IC-4, the frequency of which is adjusted by varying 100K trimpot R2. The output of the timer chip triggers both IC-5 and IC-6, which are type 4047 multivibrator chips. Each of these is set for a fixed duty cycle, and triggered on either the positive-going transition or the negative-going transition of the timer. Outputs of IC5 and IC6 are delivered through type 555 timer chips IC7 and IC8 which are used as buffers capable of sourcing 200 milliamps. The output of the 555's alternatively turns on one or the other of the power transistors Q1 and Q2, to produce essentially a square wave AC at the output of transformer T1, which connects to the analyzer filament. The maximum allowable filament current is settable by adjusting R2, and hence the maximum frequency of EC4. The average filament power is dependent on frequency. The series pass transistor Q3 controls the height of the pulses. The analyzer trap current is sensed by IC-1 which is floating with respect to ground, and the output goes through optical isolator OC1. The output of the optical isolator is compared with the reference signal at op-amp IC-3. An alternative design uses the feedback from the analyzer trap to change the frequency of the oscillator, thereby controlling filament current.

Referring now to FIG. 8, ion current in the Faraday cup is sensed using an electrometer based on an ultra-low bias current operational amplifier (Teledyne-Philbrick model 1702). The op-amp input circuitry is mounted on Teflon standoff insulators, and a feedback resistor of $10^{11}$ ohms (Victoreen RX-19509G) paralleled by about 2 pF provides a time constant of about ½ second.

Referring now to FIG. 9, a front panel wiring diagram is shown enabling control of the various components.

For maintenance of vacuum, typically on the order of $10^{-5}$ torr in the analyzer tube, an 8 L/sec diode sputter ion pump is used (Varian order no. 911-5005, with pump magnet order no. 911-0030). Referring to FIG. 2, the required +3000 volt power is supplied by a DC-DC converter circuit 52 (Gamma High Voltage Research Model UC30-3.5PICM) capable of delivering up to 7 ma. No load power consumption of the converter is of the order of about 1 watt. A 111 ohm resistor is provided in the return circuit of the ion pump power supply to monitor ion pump current (and, hence, gas pressure at the pump). A separate panel meter (Metrabyte model 2002) provides the operator with a continuous reading of this parameter. Should high vacuum be required as a part of field operations remote from a source of 100 volt AC electric power, roughing can be accomplished by a battery operated vacuum pump. Such a pump may be constructed from a Sargent-Welch model 8804 direct-coupled vacuum pump and a 0.25 horsepower 12 volt DC motor (Pacific Scientific Model BA3G18-7004-9-48B). The pump may be powered, for example, from a car battery.

The cycloid tube has built-in filament and plate heaters, which are useful for degassing of the analyzer. The two plate heaters are series connected and driven by the parallel output of four unregulated DC-DC converters (Pico 5E5S) while the filament heater is driven by a pair of unregulated DC-DC converters (Pico 12E5S). Alternatively, a single DC-AC converter with a custom-wound transformer having appropriate secondaries might be used as an alternative power supply.

Referring now to FIG. 10–10*a*, a schematic of the computer interface is shown. A full description of the interface can be found in "Computer Interface for a Portable Mass Spectrometer", Penn Loh, Bachelor Thesis, Department of Electrical Engineering and Computer Science, Massachusetts Institute of Technology, Cambridge, Mass. 1990, the entire contents of which are hereby incorporated by reference. Briefly, the circuit uses a voltage to frequency conversion scheme to convert the analog spectrometer signal to digital format. An IOTech Digital232 is used to send the digital signal via the RS232 serial data port of a lap top IBM-compatible computer. A control program may be written for example in QuickBasic on an IBM compatible.

The mass spectrometer's 0 to 10 volt output is taken from the electrometer. From there, the signal is converted from an analog voltage to a frequency ranging from 0 to 1 MHz. A 15.26 Hz timing signal is used set up counting periods of the frequency signal. Each count from the counters is then latched in a set of registers. The Digital 232 I/O converter will then latch the data and send it serially over the RS232 interface to the host computer as requested.

The computer can be adapted to automate the scan and data acquisition from the mass spectrometer. The computer can first send out a scan voltage through the Digital232, wait until the signal from the spectrometer has settled, and then read in the data. Because the counters are counting continuously, the software has control of the scan. The signal at the inputs to the Digital232 are always valid since they are latched with a set of registers.

The data acquisition circuit consists of a voltage to frequency converter, an optoisolator, counters, a timer circuit, and registers. For the analog to digital conversion of the mass spectrometer output, a voltage to frequency scheme may be used. A voltage to frequency converter has several advantages over the traditional analog to digital converter for a portable mass spectrometer interface. First, it is more accurate. Second, because it is integrating the signal, it is much less sensitive to noise. Third, it allows for variable time of conversion. Therefore, a signal that is small in magnitude can be more accurately measured by using a longer counting period.

Minimization of power consumption throughout the spectrometer increases the life of the battery power supply and allows the use of a smaller-sized batteries. Therefore, the system was designed so that the number of components in the circuit and the type of components used minimize power loss. CMOS chips were used to provide reduced power consumption over TTL type chips. The power consumption and current drawn by the circuit are: −11.33 mA from 5 volt supply = 56.65 mW for the Data Acquisition Circuit and −430 mA from 9 volt DC supply = 3.87 W for the Digital 232.

High resolution and accuracy of the data acquisition circuit is provided as follows. The 0 to 10 volt output from the mass spectrometer can be resolved into a 16-bit number by converting the signal from a voltage to frequency and then counting. The result is that the least significant bit of the 16-bit number is the equivalent of 152.6 uV.

The computer may be, for example, programmed to automate taking scans from the mass spectrometer. The control of the mass spectrometer involves sending it a voltage corresponding to a new mass to scan for and then reading the output signal. The programming may allow for user control of various aspects of the scan including the range and accuracy.

The IOTech Digital232 I/O converter is the link between the data acquisition circuit and the computer. The Digital232 communicates through the RS232 serial data interface with the computer and has five 8-bit TTL level ports that can be configured as either input or output. All the relevant information for interfacing the Digital232 can be found in the Pen Loh Thesis, incorporated supra.

Referring now to FIG. 10*a*, a typical bit in digital to analog converter is illustrated.

In operation, each of 16 lines from the RS232 interface operates the input side of a section of an ILQ1 optical isolator. If the line is high (on), the corresponding output transistor of the ILQ1 will conduct, pulling the corresponding digital input line (in this figure, pin 1) of the DAC chip High. The DAC chip, type 71HCSB-V, manufactured by Analog Devices, Inc. of Norwood, Mass, then generates the desired scan voltage at pin 17.

A program may be written in Microsoft QuickBasic on an IBM PC compatible microcomputer. In one preferred embodiment, the program can be divided into four basic sections.

1. Initialization of the communication port and the Digital232.
2. User configuration
3. Control and data acquisition loop
4. Output to file and screen The program consists of one main program, two subroutines, and one function. The main program opens the communications port and then elicits user inputs for scan range, increment between scan voltages, number of counts for each scan, and the delay time between each scan. The scan subroutine then handles the control and data acquisition loop and the output to screen and file. The delay subroutine is a timer that delays the program between the time that the control voltage is sent and the time that the data is read. The delay allows the mass spectrometer time to settle at a new value. The output of the program includes for each scan voltage, the count values, the average of the counts, and the voltage represented by the average count. This information is output to both the screen and a data file.

Referring now to FIG. 11, the portable mass spectrometer system, in preferred embodiments including the magnet assembly as discussed in FIG. 2 and constructed as in FIGS. 3–9, assembled in frame-work constructed of welded 0.19 inch by 1.25 inch aluminum angles. Actual outside dimensions of the frame are 8 inch × 14 inch × 22 inch. The cycloid tube is mounted in yokes which allow small angular adjustments of the cycloid tube about an axis perpendicular to the magnetic field. The magnet 6 is mounted directly to the aluminum frame to provide for small angular adjustments about the second axis perpendicular to the magnetic field. The sputter ion pump, mounted on a 2.75 inch knife edge flange is cantilevered from the vacuum envelope. Individual circuit boards for emission regulator 15, mass scanning circuit 10, electrometer (not visible under panel) and power supply board 14 are mounted to the aluminum frame using metal spacers. The 12 volt battery 1 is also illustrated. A cord 3 enables an external power supply to be used such as a car battery. The overall weight of the system including the battery is about 70 lbs. The spectrometer includes a control panel 18 which includes controls such as external power switch 42, for operation from an external battery if desired, sputter ion pump power switch 44, emission regulator power switch 46, scan circuit power 48, a power switch for panel meters and electrometer 52, plate heater power switch 54, filament heater power switch 56, computer interface power switch 58, internal battery main power switch 62, filament or trap current selector switch 64, Hi/Lo mass range switch 66, manual or computer scan control 68, and electrometer meter gain 72. Also included is manual scanning knob 74 ion current (electrometer) read-out 76, inlet pressure read-out 78, ion pump pressure read-out 82 and filament and tap current read-out 84. Also includes is a Baratron isolation valve 86, gas inlet connector 88, focussing adjustment for the potentiometers 92 and connectors for the scan output 94 and electrometer output 96. Fuses "F" are also accessible from the panel. It will be understood that with the use of a low weight magnet design as described below, less rigid, lower weight materials may be used for the supporting structure, further reducing the weight.

OPERATION

Referring to the preferred embodiment in FIG. 11, in operation, for example, for analyses of samples at a remote hazardous waste site, such as a site of a chemical spill, the operator first prepares the portable spectrometer by charging the self-contained 12 volt battery, and initially pumping down the system using an external roughing pump. The main power is turned on, powering only the ion pump during transport of the system. At the site of the spill, the user may operate the system for analysis of samples.

A typical procedure would include a) attachment of a probe to the inlet connection of the machine;

b) evacuation of the probe using a line-powered or battery-powered mechanical vacuum pump, or an absorption pump;

c) opening the isolation valve, so that vacuum is maintained in the inlet system by the main vacuum system of the mass spectrometer;

d) turning on power to the scan, emission regulator, electrometer, and panel meter circuitry;

e) adjusting emission to the desired value, typically 20 $\mu$A, using the trap current control;

f) placing the probe in a standard of known composition, such as a solution of 100 parts per million of TCE or methane in water, and scanning. The scan procedure requires turning the SCAN control on the front panel through its full range, noting the intensity of each peak reached on the ion current meter, and the value to which the SCAN control is set for each peak;

g) identifying the m/e value of each peak by comparison with the known mass spectra of the standard chemical, and plotting a mass calibration curve or computing K in an equation which is of the form:

$$m/e = K/\text{SCAN reading}$$

the constant K is calculated by knowledge of an actual m/e value and its SCAN reading;

h) placing the probe in a water, gas, or soil sample for which analysis is desired, and repeating a complete scan as in step f, after a brief time (typically 2–3 min.) has been allowed for sample flow to stabilize;

i) Identifying the chemicals present in the sample by inspection of the observed spectrum, or by use of algorithms intended for mass spectrum separation, (such as described by Richard Doherty MIT Master's Thesis, 1988);

j) Use of a battery-operated or line-operated strip chart recorder can facilitate the recording of data during each scan;

k) use of the microcomputer interface allows a microcomputer to automatically perform the scan procedure described by step f. With suitable software the computer can also automatically perform calibration as described in step g, and spectrum identification as described in step i);

l) An accurate quantification of chemicals present in a sample can be obtained with the machine calibrated with the probe in samples containing the chemical of interest at known concentration. For a given trap current, ion current is proportional to chemical concentration.

FIG. 12*a* and 12*b* shows spectra obtained from moist air and an unquantified concentration of dissolved methane in water, respectively. The spectra were obtained by a single silicon rubber membrane interface connected to the mass spectrometer inlet, with no other provisions for sample enrichment or water vapor removal.

OTHER EMBODIMENTS

It will be understood that the system may be constructed other than as described above to yield lower power consumption, weight, and size. Further gains may be made by incorporating sophisticated and environmental probes such as the use of multiple membrane probes and appropriate vapor drawing techniques. It will also be understood that the system can be used for identification of a variety of compounds and analysis of a variety of samples. For example, leaked volatile chemicals and the measurement of oxygen, carbon dioxide, methane and other metabolic gases and waters, soil and sediments, monitoring of process streams for product composition, or of water supplies for contamination, or unknown mixtures of water liquids requiring identification for proper disposal.

It will also be understood that variations of the above-described preferred embodiments fall within the invention. For example, systems having a mass range up to 250 amu may be required for analysis of some volatile species (even higher mass range may be required for nonvolatiles); magnets having various gap widths, e.g., from 0.5 to 5 cm and field strengths, e.g., from 1500 to 5000 gauss also have useful applications.

Other embodiments are in the claims.

What is claimed is:

1. A portable mass spectrometer system, comprising:
   - a sample inlet for receiving a sample of analyte molecules,
   - an ion source for producing sample ions by ionization of said analyte molecules,
   - a cycloid mass analyzer for receiving said sample ions, said mass analyzer having a means for inducing a DC electric field in an analysis region and a rare earth permanent magnet material for inducing a static magnetic field in said analysis region oriented substantially normal to said electric field, said fields acting to induce planar spiral paths on sample ions in said region,
   - a detector in the plane of said spiral paths for detection of sample ions of a given m/e ratio traveling along a spiral path defined by the strength of said electric and magnetic fields, and
   - vacuum means for maintaining a low pressure in said analysis region.

2. The system of claim 1 wherein said magnet material has an energy product of about $20 \times 10^6$ gauss-oersteds or more.

3. The system of claim 2 wherein said permanent magnet material has an energy product in the range of about $30 \times 10^6$ gauss-oersteds or more.

4. The system of claim 1 wherein said magnet is selected from the group consisting of neodymium-iron and samarium-cobalt alloys.

5. The system of claim 4 wherein said magnet includes a magnet return assembly selected from the group consisting of mild steel and iron-cobalt alloy such as vanadium Permendur.

6. The system of claim 5 wherein said magnet produces a field strength of about 1500 to 5000 Gauss in the region of mass analysis.

7. The system of claim 6 wherein said magnet has a gap width of about 0.5 to 5 cm.

8. The system of any one of claims 1 to 7 wherein the magnet and return assembly has a weight of less than about 20 kg.

9. The system of claim 8 wherein said magnet and return assembly has a weight in the range of about 8 to 10 kg.

10. The system of claim 1 being constructed for scanning over a range from about m/e = 2 to 250 with unit mass resolution.

11. The system of claim 10 wherein said cycloid analyzer is constructed for scanning over a range of about m/e = 2 to 150 by variation of a voltage in the range of about 0 to 300 volts, said analyzer including low power consumption analyzer circuitry based on an operational amplifier.

12. The system of claim 10 being constructed for the analysis of low molecular weight sample ions by magnetic deflection of said ions, without the application of electric fields in the analysis region.

13. The system of claim 1 wherein said detector means comprises a Faraday cup and an electrometer for measurement of sample ions.

14. The system of claim 1 adapted as a self-contained system further comprising a battery power supply and said ionization means, mass analyzer, vacuum means and detector include associated electronics enabling operation from said battery.

15. The system of claim 14 wherein said battery is a 12 volt battery.

16. The system of claim 15 wherein said system and electronics are constructed for a power consumption of about 30 watts or less.

17. The system of claim 16 wherein said system is constructed for a power consumption of about 24 watts.

18. The system of claim 14 wherein said ionization means includes emission regulator circuitry, to run from unregulated DC power, without the use of a transformer.

19. The system of claim 18 wherein said emission regulator includes a sensor means for detection of emission current and feedback circuitry for control of filament current in response to said detected emission current.

20. The system of claim 14 further including separate switching means to enable shutting down of said ion source, cycloid mass analyzer, detector and vacuum means during periods of non-use.

21. The system of claim 1 or 14 wherein said vacuum means is constructed to maintain a pressure in the range of about $10^{-5}$ torr or lower.

22. The system of claim 21 wherein said vacuum means is an ion pump having a pumping speed of about 10 L/sec or less.

23. The system of claim 14 further comprising a heater means for degassing said analyzer, and a pressure gauge for monitoring the pressure in said inlet means, said heater means and pressure gauge operating from said battery.

24. The system of claim 1 or 14 constructed to have a weight of about 80 lbs. or less.

25. The system of claim 1 constructed having physical dimensions enabling the system to be carriable on a back-pack.

26. A self-contained, hand-portable mass spectrometer system for operation in a location remote from line power, comprising:
   - a sample inlet for receiving a sample of analyte molecules,
   - an ion source for producing sample ions by ionization of said analyte molecules,
   - a cycloid mass analyzer to receive and analyze sample ions over a range of masses, said mass analyzer having a means for inducing a variable, DC electric field in said analysis region and magnet assembly having a rare earth permanent magnet material with an energy product of about a $20 \times 10^6$ gauss-oersteds or more and a light-weight magnet return for inducing a static magnetic field in said analysis region, oriented substantially normal to said electric field said magnet assembly having a weight of about 20 kg or less, said fields acting to induce planar spiral paths on sample ions in said region;
   - a faraday cup detector in the plane of said spiral paths for detection of sample ions of a given m/e ratio, traveling along a particular planar spiral path defined by the strength of said electric and magnetic fields, scanning means for varying said DC field to vary said given m/e ratio detected by said detector, an ion pump vacuum means for maintaining a low pressure in said analysis region in the range of about 10−5 torr or less, a DC power supply comprising a 12 volt battery, and associated electronics constructed to enable said ionization means, cycloid mass analyzer, detector and vacuum means to operate from said DC power over an extended time, remote from line power.

27. The system of claim 26 wherein said magnet has a magnetic material having an energy product of about $30\times10^6$ gauss-oersted or more.

28. The system of claim 26 or 27 wherein said magnetic material is selected from the group consisting of neodymium-iron and samarium-cobalt alloys.

29. The system of claim 28 wherein said magnet includes a magnet return selected from the group consisting of mild steel and vanadium permendur.

30. The system of claim 26 wherein said system is constructed to operate with a power consumption of about 24 watts.

31. The system of claim 30 further comprising a heater means for degassing said analyzer, and a pressure gauge for monitoring the pressure in said inlet means, said heater means and pressure gauge being constructed to operate from said battery.

32. The system of claim 26 further including separate switching means to enable shutting down of said ion source, cycloid mass analyzer, detector and vacuum means during period of non-use.

33. The system of claim 26 constructed to have a weight of about 80 lbs. or less.

34. The system of claim 26 constructed having physical dimensions enabling the system to be carriable on a back-pack.

35. A portable mass spectrometer system, comprising:

a sample inlet for receiving a sample of analyte molecules, an ion source for producing sample ions by ionization of said sample molecules, a cycloid mass analyzer to receive said sample ions, said mass analyzer having means for inducing a DC electric field in an analysis region and a more earth permanent magnet material having an energy product of about $20\times10^6$ gauss-oersteds or more for inducing a static magnetic field in said analysis region oriented substantially normal to said electric field, said fields acting to induce planar spiral paths on sample ions in said region, a detector in the plane of said spiral paths for detection of sample ions of a given m/e ratio traveling along a particular spiral path defined by the strength of said electric and magnetic fields, and a vacuum means for maintaining a low pressure in said analysis region.

36. The system of claim 35 wherein said magnetic material has an energy product of about $30\times10^6$ gauss-oersted or more.

37. The system of claim 35 as a self-contained system further comprising a battery power supply and said ionization means, mass analyzer, vacuum means and detector include associated electronics enabling operation from said battery.

38. The system of claim 35 or 37 constructed to have a weight of about 80 lbs. or less.

39. The system of claim 38 constructed having physical dimensions enabling the system to be carriable on a back-pack.

* * * * *